United States Patent
Song et al.

(10) Patent No.: US 11,288,548 B2
(45) Date of Patent: Mar. 29, 2022

(54) TARGET DETECTION METHOD AND APPARATUS, AND COMPUTER DEVICE

(71) Applicant: HANGZHOU HIKVISION DIGITAL TECHNOLOGY CO., LTD., Hangzhou (CN)

(72) Inventors: Tao Song, Hangzhou (CN); Di Xie, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/758,443

(22) PCT Filed: Oct. 16, 2018

(86) PCT No.: PCT/CN2018/110394
§ 371 (c)(1),
(2) Date: Apr. 23, 2020

(87) PCT Pub. No.: WO2019/080743
PCT Pub. Date: May 2, 2019

(65) Prior Publication Data
US 2020/0250487 A1    Aug. 6, 2020

(30) Foreign Application Priority Data
Oct. 23, 2017 (CN) .......................... 201711004621.7

(51) Int. Cl.
*G06K 9/62* (2006.01)
*G06N 3/08* (2006.01)

(52) U.S. Cl.
CPC ......... *G06K 9/6262* (2013.01); *G06K 9/6215* (2013.01); *G06K 9/6256* (2013.01); *G06N 3/08* (2013.01)

(58) Field of Classification Search
CPC .. G06K 9/6262; G06K 9/6261; G06K 9/6267; G06K 9/6215; G06K 9/6214;
(Continued)

(56) References Cited

U.S. PATENT DOCUMENTS 7,450,735 B1 * 11/2008 Shah ..................... G06T 7/292
348/143
8,131,011 B2    3/2012 Nevatia et al.
(Continued)

FOREIGN PATENT DOCUMENTS

CN    102880877 a    1/2013
CN    106485230 A    3/2017
(Continued)

OTHER PUBLICATIONS

International Search Report issued in corresponding application No. PCT/CN2018/110394, dated Jan. 2, 2019, 5 pages.
(Continued)

*Primary Examiner* — Sean M Conner
*Assistant Examiner* — Stephen M Brinich
(74) *Attorney, Agent, or Firm* — Meunier Carlin & Curfman LLC

(57) ABSTRACT

Embodiments of methods and apparatuses for object detection and of computer devices are disclosed. The method for object detection includes: acquiring an image to be detected that is captured by an image capturing means; inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected; for the object upper-vertex confidence distribution diagram and the object lower-vertex confidence distribution diagram respectively, determining upper-vertex objects and
(Continued)

lower-vertex objects in the image to be detected by using a preset object determination method; for each first vertex, calculating a correlation value of a connection line connecting the first vertex object and each of second vertex object respectively by mapping the upper-vertex objects and the lower-vertex object onto the object upper-and-lower-vertex correlation diagram; and based on the correlation values, determining a connection line having a maximum correlation value as a specified object by matching the upper-vertex objects and lower-vertex objects. The accuracy of object detection can be improved through the present solution.

13 Claims, 8 Drawing Sheets

(58) Field of Classification Search
CPC ......... G06K 2009/6213; G06K 9/6217; G06K 9/6256; G06K 9/6255
USPC .................. 382/103, 100, 107, 115, 291
See application file for complete search history.

(56) References Cited

U.S. PATENT DOCUMENTS

| | | | |
|---|---|---|---|
| 2014/0270367 A1 | 9/2014 | Wang et al. | |
| 2016/0012611 A1* | 1/2016 | Wexler | G06T 7/62 382/103 |
| 2016/0140732 A1* | 5/2016 | Brown | G06T 7/80 382/103 |
| 2016/0272206 A1* | 9/2016 | Miyano | G06K 9/4638 |
| 2017/0140236 A1 | 5/2017 | Price et al. | |
| 2019/0180444 A1* | 6/2019 | Terekhov | G06T 7/13 |

FOREIGN PATENT DOCUMENTS

| | | |
|---|---|---|
| CN | 106570453 A | 4/2017 |
| CN | 106651955 A | 5/2017 |
| CN | 106651955 A | 5/2017 |
| CN | 106845374 A | 6/2017 |
| CN | 107066990 A | 8/2017 |

OTHER PUBLICATIONS

First Office Action issued for Chinese Application No. 201711004621. 7, dated Apr. 30, 2020.
Cai, et al., "Scene adaptive pedestrian detection algorithm based on deep model", Journal of Southeast University, Jul. 2017, 47(4):679-684. English Abstract included in text.
Extended European Search Report received in connection with European Application No. 18871198.0 dated Nov. 26, 2020, 8 pages.
Wang et al., Part-Level Fully Convolutional Networks for Pedestrian Detection, 2017 IEEE International Conference on Acoustics, Speech and Signal Processing (ICASSP), Xidian University School of Electronic Engineering, Xian, Shaanxi, China and University of Michigan, Electrical Engineering and Computer Science, Ann Arbor, Michigan, USA, 2017, p. 2267-2271.

* cited by examiner

TARGET DETECTION METHOD AND APPARATUS, AND COMPUTER DEVICE

This is a national phase application filed under 35 U.S.C. § 371 of PCT International Application No. PCT/CN2018/110394, filed on Oct. 16, 2018, entitled "TARGET DETECTION METHOD AND APPARATUS, AND COMPUTER DEVICE," which claims the priority to a Chinese patent application No. 201711004621.7, filed with the China National Intellectual Property Administration on Oct. 23, 2017, which are incorporated herein by reference in their entireties.

TECHNICAL FIELD

The present application relates to the field of machine vision technology, and in particular to a method and an apparatus for object detection, and a computer device.

BACKGROUND

With social progress, video surveillance systems have found a wide application. Intelligent surveillance has attracted considerable research interests in video surveillance technology. It has a variety of applications in certain places, such as banks, stations, shopping malls, and other public places in recent years. As a part of the intelligent surveillance, object detection is of great importance. Object detection may consist of determining the existence of a specified object in an input image or video, and outputting information on the position of the specified object in the image or video. At present, commonly used techniques for object detection mainly include a background subtraction approach, a frame differencing approach, an optical flow approach, a template matching approach, and a machine learning based approach. The first four approaches for object detection are conventional approaches for object detection based on image processing, and are susceptible to changes in illumination, color, and posture, etc., while the machine learning based approach for objection detection learns various changes of specified objects from a set of samples and has good robustness.

In related methods for object detection based on machine learning, a training set of samples is first constructed, and a convolutional neural network model is obtained through training on the training set of samples. When detecting an object, an image to be detected is input into the trained convolutional neural network model to obtain candidate boxes and confidence corresponding to the specified object, and then non-maximum suppression and selection with threshold are performed to determine the specified object in the image to be detected.

However, in certain circumstances, the objects may be densely distributed. For example, in a place with a dense crowded, people, as the objects to be detected, may be huddled together. As a result, candidate boxes obtained using such machine learning based methods may overlap with other. When performing the non-maximum suppression on the overlapped candidate boxes, a true candidate box for a specified object may be discarded, which may result in some objects being not detected and result in a detection error.

SUMMARY

The objective of the embodiments of the present application is to provide a method, an apparatus for object detection and a computer device, to improve the accuracy of object detection. The specific technical solutions are as follows.

In the first aspect, an embodiment of the present application provides a method for object detection, and the method includes:

acquiring an image to be detected that is captured by an image capturing means;

inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected;

for the object upper-vertex confidence distribution diagram and the object lower-vertex confidence distribution diagram respectively, determining one or more upper-vertex objects and one or more lower-vertex objects in the image to be detected by using a preset object determination method;

for each first vertex object, calculating a correlation value of a connection line connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object; and determining a connection line having a maximum correlation value as a specified object based on the correlation values of the connection lines connecting the first vertex object and the second vertex objects by matching upper-vertex objects and lower-vertex objects.

In the second aspect, an embodiment of the present application provides an apparatus for object detection, and the apparatus includes:

a first acquisition module, configured for acquiring an image to be detected that is captured by an image capturing means;

a first generation module, configured for inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected;

an object determination module, configured for, for the object upper-vertex confidence distribution diagram and the object lower-vertex confidence distribution diagram respectively, determining one or more upper-vertex objects and one or more lower-vertex objects in the image to be detected by using a preset object determination method;

a first calculation module, configured for, for each first vertex object, calculating a correlation value of a connection line connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object; and a matching module, configured for determining a connection line having a maximum correlation value as a specified object based on the correlation values of the connection lines connecting the first vertex object and the second vertex objects by matching upper-vertex objects and lower-vertex objects.

In the third aspect, an embodiment of the present application provides a storage medium having stored thereon executable codes that, when executed, carry out the method for object detection according to the first aspect of the present application.

In the fourth aspect, an embodiment of the present application provides an application program which, when executed, carries out the method for object detection according to the first aspect of the present application.

In the fifth aspect, an embodiment of the present application provides a computer device including an image capturing means, a processor and a storage medium, wherein the image capturing means is configured for capturing an image to be detected;

the storage medium is configured for storing executable code; and the processor is configured for carrying out the method for object detection according to the first aspect when executing the executable code stored in the storage medium.

In view of above, in the solution according to the embodiment of the present application, the object upper-vertex confidence distribution diagram, the object lower-vertex confidence distribution diagram, and the upper-and-lower-vertex correlation diagram of the image to be detected are generated by inputting the obtained image to be detected into the fully convolutional neural network obtained by training; the upper-vertex objects and the lower-vertex objects in the image to be detected are determined respectively according to the object upper-vertex confidence distribution diagram and the object lower-vertex confidence distribution diagram; the correlation value of the connection line between the first vertex and each second vertex is calculated by mapping the upper-vertex objects and the lower-vertex objects into the upper-and-lower-vertex correlation diagram; and finally, based on each correlation value, the connection line with the maximum correlation value is determined as the specified object by matching the upper-vertex objects and lower-vertex objects. By using the fully convolutional neural network obtained by training, the upper-vertex objects and lower-vertex objects of the specified objects can be extracted, and the connections between the upper-vertex objects and lower-vertex objects are established by mapping, and then the connection lines between the upper-vertex objects and lower-vertex objects that are matched successfully are used as the specified objects. The specified objects are represented by connection lines, which avoids a case where candidate boxes are overlapped. Even if the specified objects are distributed densely, since the upper-vertex objects and lower-vertex objects of the specified objects can be accurately positioned by the fully convolutional neural network, the specified objects can be clearly distinguished through the connection lines between the upper-vertex objects and lower-vertex objects, which improves the accuracy of object detection.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make the objectives, technical solutions and advantages of the present application more apparent, details will be with reference to the accompanying drawings and by way of examples. Obviously, the embodiments described herein are only some of the embodiments of the present application instead of all of them. Any other embodiments obtained by those of ordinary skills in the art based on the embodiments herein without any creative efforts are within the scope of the present application.

Specific details will be given in connection with embodiments.

In order to improve the accuracy of object detection, embodiments of the present application provide a method and an apparatus for object detection, and a computer device.

The method for object detection according to an embodiment of the present application will be first introduced below.

The method for object detection according to the embodiment of the present application may be performed by a computer device equipped with a core processing chip, for example, a camera, an image processor or any suitable devices capable of processing images. The method for object detection according to the embodiment of the present application may be implemented as at least one of software, a hardware circuit, or a logic circuit provided in the product implementing the method.

Figure 1:
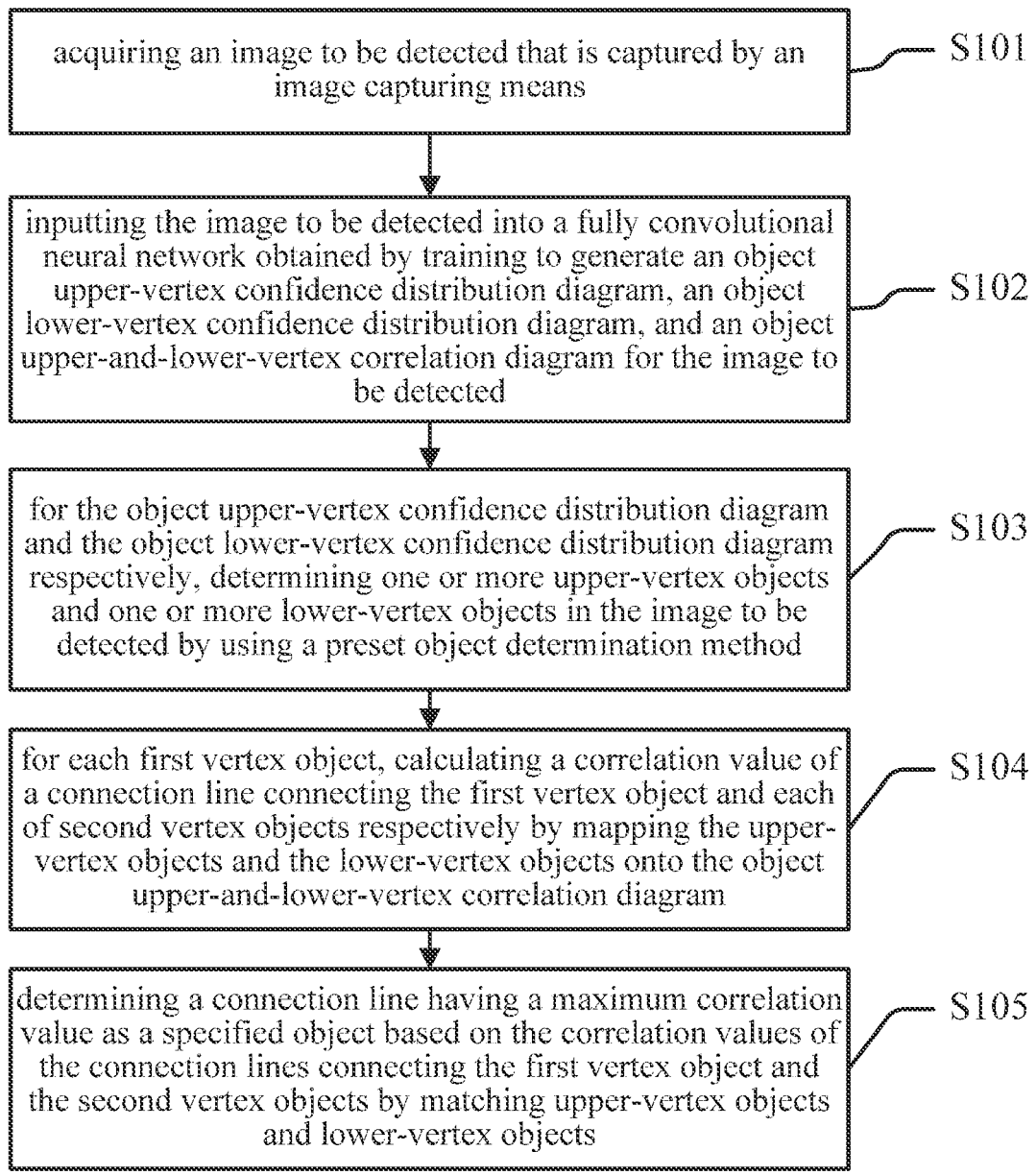
FIG. 1 is a schematic flowchart of a method for object detection according to an embodiment of the present application.

As shown in FIG. 1, the method for object detection according to the embodiment of the present application may include following steps.

At step S101, an image to be detected that is captured by an image capturing means is acquired.

The image capturing means may be, but not limited to, a video camera or a camera. If the image capturing means is a video camera, the video camera captures a video over a period of time, and the image to be detected may be an image frame of the video.

At step S102, the image to be detected is input into a fully convolutional neural network obtained by training to generate an object upper-vertex confidence distribution diagram, an object lower-vertex confidence distribution diagram, and an object upper-and-lower-vertex connection diagram for the image to be detected.

Figure 2:
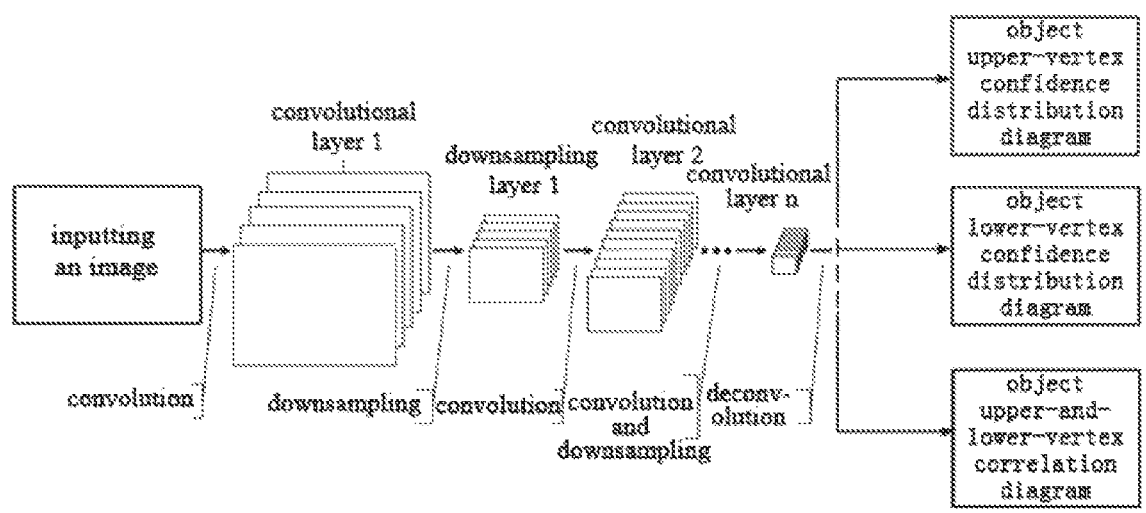
FIG. 2 is a schematic structural diagram of a fully convolutional neural network according to an embodiment of the present application.

The fully convolutional neural network has the ability to automatically extract features of upper-vertex objects and lower-vertex objects of a specified object, and parameters of the network for the fully convolutional neural network can be obtained by training with samples. Therefore, the fully convolutional neural network obtained by training can allow fast recognition of the upper-vertex objects and the lower-vertex objects of the specified object. In an embodiment of the present application, as shown in FIG. 2, the fully convolutional neural network consists of a plurality of convolutional layers and downsampling layers which are alternately arranged. The acquired image to be detected is input into the fully convolutional neural network. The fully convolutional neural network extracts features of upper-vertex objects and lower-vertex objects of the specified objects in the image to be detected, and thus obtains the object upper-vertex confidence distribution diagram, the object lower-vertex confidence distribution diagram, and the object upper-and-lower-vertex correlation diagram of the image to be detected.

The object upper-vertex confidence distribution diagram and the object lower-vertex confidence distribution diagram may be respectively understood as a diagram of distribution of probabilities that detected objects are the upper-vertex objects and the lower-vertex objects of the specified objects. For example, if the specified object is people, the object upper-vertex confidence distribution diagram is a diagram of the distribution of probabilities that the detected objects are the top of the head of the people; and the object lower-vertex confidence distribution diagram is a diagram of the distribution of probabilities that the detected objects are the foot of people. Each pixel on the upper-and-lower-vertex correlation diagram represents a correlation degree value indicating the existence of the upper-vertex object or the lower-vertex object of a specified object at this pixel position. Parameters of the object upper-vertex confidence distribution diagram and parameters of the object lower-vertex confidence distribution diagram may respectively be probability values that an object in each identified region is the upper-vertex object or the lower-vertex object of a specified object. The identified region has a size and position related to the position and size of an object. Generally, the area of the region may be greater than or equal to the actual size of the object. The probability may also be represented by pixel value of a pixel. The larger the pixel values of pixels in the region, the greater the probability that the object in the region is the upper-vertex object or the lower-vertex object of the specified object. Of course, in the embodiment of the present application do not limit the specific parameters of the object upper-vertex confidence distribution diagram and the object lower-vertex confidence distribution diagram.

Optionally, the fully convolutional neural network may include a convolutional layer, a downsampling layer, and a deconvolutional layer. The fully convolutional neural network usually includes at least one convolutional layer and at least one downsampling layer, and the deconvolutional layer is optional. A deconvolutional layer may be provided after the last convolutional layer, such that the resulting feature map has a same resolution as the input image to be detected so as to reduce the operation for calculating the image compression ratio to facilitate feature extraction.

Optionally, step S102 may include the following steps.

Step 1, inputting the image to be detected into the fully convolutional neural network obtained by training, and extracting features of the image to be detected through a network structure including the convolutional layers and the downsampling layers alternately arranged.

Step 2, upsampling the features such that the features have a same resolution as the image to be detected through the deconvolutional layer, to obtain an upsampled features.

The image to be detected is input into the fully convolutional neural network obtained by training, and features from low to high layers are sequentially extracted using a series of convolutional layers and downsampling layers. The series of the convolutional layers and the downsampling layers are arranged alternately. The features are then upsampled to have a size same as the size of the input image to be detected through the deconvolutional layer.

Step 3, applying a convolutional layer of 1×1 on the upsampled features obtained in Step 2 to calculate the object upper-vertex confidence distribution diagram, the object lower-vertex confidence distribution diagram, and the object upper-and-lower-vertex correlation diagram that have a same resolution as the image to be detected.

In order to ensure that the object upper-vertex confidence distribution diagram, the object lower-vertex confidence distribution diagram, and the object upper-and-lower-vertex correlation diagram have the same resolution as the image to be detected, the output from the upsampling may be processed through a convolutional layer. The size of the convolution kernel of the convolutional layer may be selected as 1×1, 3×3, or 5×5. However, in order to accurately extract a feature of one pixel, the size of the convolution kernel of the convolutional layer may be selected as 1×1. Through the calculation of this convolutional layer, the object upper-vertex confidence distribution diagram, the object lower-vertex confidence distribution diagram, and the object upper-and-lower-vertex correlation diagram can be obtained.

At step S103, for the object upper-vertex confidence distribution diagram and the object lower-vertex confidence distribution diagram respectively, one or more upper-vertex objects and one or more lower-vertex object in the image to be detected are determined by using a preset object determination method.

The object upper-vertex confidence distribution diagram of the image to be detected obtained through the fully convolutional neural network includes probabilities that the object in each identified region is an upper-vertex object of a specified object, and the object lower-vertex confidence distribution diagram includes probabilities that the object in each identified region is a lower-vertex object of a specified object. Thus, all objects may include objects other than the upper-vertex objects and the lower-vertex objects. Therefore, for the object upper-vertex confidence distribution diagram and the object lower-vertex confidence distribution diagram of the image to be detected respectively, it needs to determine the accurate upper-vertex objects of the specified objects in the image to be detected from the object upper-vertex confidence distribution diagram, and to determine the accurate lower-vertex objects of the specified objects in the image to be detected from the object lower-vertex confidence distribution diagram by using the preset object determination method. For example, the preset object determination method may be based on a threshold. If a probability in the object upper-vertex confidence distribution diagram is greater than the threshold, it is determined that the region corresponding to this probability is an upper-vertex object. If a probability in the object lower-vertex confidence distribution diagram is greater than the threshold, it is determined that the region corresponding to this probability is a lower-vertex object. For another example, the preset object determination method may also be based on the values of pixels. If values of pixels in a region are greater than a preset pixel value, it is determined that the region is an upper-vertex object or a lower-vertex object. For another example, if the confidences of each pixels in a region are greater than a preset confidence threshold, it is determined that the region is an upper-vertex object or a lower-vertex object. For example, if the average value of the confidences of the pixels in a region is greater than a preset confidence threshold, it is determined that the region is an upper-vertex object or a lower-vertex object. Of course, the specific method for determining the upper-vertex object and the lower-vertex is not limited to these examples, and the method based on a threshold may be used for illustration.

Optionally, S103 may be include following steps.

Step 1, for the object upper-vertex confidence distribution diagram and the object lower-vertex confidence distribution diagram respectively, determining a position of a center point of one or more detection object by using a non-maximum suppression method.

In the object upper-vertex confidence distribution diagram and the object lower-vertex confidence distribution diagram of the image to be detected, a point having the maximum confidence represents the position of the center point of a detection object, and non-zero points in spatial aggregation in the confidence distribution diagram represent the region where a detection object is located. The non-maximum suppression method is used for the object upper-vertex confidence distribution diagram and the object lower-vertex confidence distribution diagram respectively. The position of the center point of each detection object can be obtained by suppressing non-maximum elements and searching for the maximum in region. The formation of a region is related to the confidence of each pixel. The region may be deviated from the actual detection object due to two objects too close to each other or influence of the background or other factors. While as the confidence maximum point characterizes the center point of the detection object, after the position of the center point is determined, the detection object may be determined within a certain neighborhood of the center point. Thus, the accuracy of object detection can be improved by determining the positions of center points.

Step 2, acquiring confidences of all pixels in a neighborhood of the center point of each detection object.

Since one detection object may be determined within the neighborhood of its center point, the size of the neighborhood may be determined according to the statistical analysis of the sizes of the upper-vertex objects and lower-vertex objects of the specified objects. For example, for people as an object, the size of the neighborhood of the upper-vertex object may be determined through an average value calculated from actual radiuses of human heads, or through a value that follows a preset distribution. The size of the neighborhood of the lower-vertex object may be set to the same value as the upper-vertex object. Of course, the size of the neighborhood of the upper-vertex object may be different from that of the lower-vertex object, and the size of the neighborhood of the lower-vertex object may also be determined according to the size of the lower-vertex object of the actual specified object. The greater the confidences of all pixels in the neighborhood of the center point of a detection object, the greater the probability that the detection object is the upper-vertex object or the lower-vertex object. Therefore, the present embodiment needs to obtain the confidences of all pixels in the neighborhood.

Step 3, in the object upper-vertex confidence distribution diagram, determining a detection object with each pixel having a confidence greater than a preset confidence threshold as the upper-vertex object; and in the object lower-vertex confidence distribution diagram, determining a detection object with each pixel having a confidence greater than the preset confidence threshold as the lower-vertex object.

The greater the confidences of all pixels in the neighborhood of the center point of a detection object, the greater the probability that the detection object is an upper-vertex object or a lower-vertex object of a specified object. Therefore, in the present embodiment, a preset confidence threshold may be set in advance. In the object upper-vertex confidence distribution diagram, if the confidences of all pixels in the neighborhood of the center point of a detection object are greater than the preset confidence threshold, it may determine that the detection object is the upper-vertex object of the image to be detected. In the object lower-vertex confidence distribution diagram, if the confidences of all pixels in the neighborhood of the center point of a detection object are greater than the preset confidence threshold, it may determine that the detection object is the lower-vertex object of the image to be detected. The preset confidence threshold may be set according to experiment data or requirements. For example, the preset confidence threshold may be set to 0.7. In the object upper-vertex confidence distribution diagram, if the confidences of all pixels in the neighborhood of the center point of the detection object are greater than 0.7, it may determine that the detection object is the upper-vertex object. In the object lower-vertex confidence distribution diagram, if the confidences of all pixels in the neighborhood of the center point of the detection object are greater than 0.7, it may determine that the detection object is the lower-vertex object. For another example, the preset confidence threshold may be set to 0.85, 0.9, or other values, which is not limited herein. The present embodiment provides that the confidences of all pixels in the neighborhood of the center point of the detection object need to be greater than the preset confidence threshold, which further ensures the accuracy of object detection.

At step S104, for each first vertex object, a correlation value of a connection line connecting the first vertex object and each of second vertex objects are calculated respectively by mapping the upper-vertex objects and the lower-vertex objects onto the object upper-and-lower-vertex correlation diagram.

The first vertex object is any upper-vertex object, and the second vertex object is any lower-vertex object. If the first vertex object is an upper-vertex object, the second vertex object is a lower-vertex object; and if the first vertex object is a lower-vertex object, the second vertex object is an upper-vertex object. After the upper-vertex objects and lower-vertex objects of the specified objects in the scene are determined, the obtained upper-vertex objects and lower-vertex objects may be mapped onto the object upper-and-lower-vertex correlation diagram obtained in step S102. Each pixel in the object upper-and-lower-vertex correlation diagram represents a correlation degree value indicating the existence of the upper-vertex object or the lower-vertex object of a specified object at the pixel position. The sum of the correlation degree values of every two upper-vertex object and lower-vertex object may be obtained by connecting each upper-vertex object with each lower-vertex object. The correlation value of a connection line connecting an upper-vertex object and a lower-vertex object may be defined as the sum of the correlation degree values of the upper-vertex object and the lower-vertex object. Alternatively, the correlation value of the connection line may be defined as the average of the correlation degree values of the upper-vertex object and lower-vertex object that are connected. for a larger correlation value of a connection line connecting the first vertex object and a second vertex object means that a higher correlation between the upper-vertex object and lower-vertex object of this connection line, i.e., a higher probability that this connection line is the specified object.

At step S105, a connection line having a maximum correlation value is determined as a specified object based on the correlation values of the connection lines connecting the first vertex object and the second vertex objects by matching upper-vertex objects and lower-vertex objects.

For a connection line connecting the first vertex object and a second vertex object, the larger the correlation value, the greater the probability that this connection line is the specified object. Therefore, the connection line with the maximum correlation value may be determined as the specified object. Moreover, in general, the specified object is formed by one second vertex object and the first vertex object. Therefore, for the first vertex object, the connection line with the maximum correlation value may be determined as the specified object by matching the upper-vertex objects and lower-vertex objects. For example, 5 upper-vertex objects and 4 lower-vertex objects are determined at step S103. For a first upper-vertex object, if the correlation value of a connection line connecting the first upper-vertex object and a first lower-vertex object is the maximum, the connection line between the first upper-vertex object and the first lower-vertex object is determined as a specified object. For a second upper-vertex object, if the correlation value of a connection line connecting the second upper-vertex object and a third lower-vertex object is the maximum, the connection line between the second upper-vertex object and the third lower-vertex object is determined as a specified object. For a third upper-vertex object, if the correlation value of a connection line connecting the third upper-vertex object and a second lower-vertex object is the maximum, the connection line between the third upper-vertex object and the second lower-vertex object is determined as a specified object. For a fifth upper-vertex object, if the correlation value of a connection line connecting the fifth upper-vertex object and a fourth lower-vertex object is the maximum, the connection line between the fifth upper-vertex object and the fourth lower-vertex object is determined as a specified object. Since the correlation values of connection lines connecting a fourth upper-vertex object and the respective lower-vertex objects are all smaller than the correlation values of other connection lines, it can be determined that the fourth upper-vertex object may be a misidentified upper-vertex object, and this upper-vertex object will be discarded. Optionally, a classic bipartite matching method, i.e., a Hungarian algorithm, may be used for matching the upper-vertex objects and lower-vertex objects, so as to implement one-to-one matching between the upper-vertex objects and the lower-vertex objects. Any methods that can implement one-to-one matching between vertexes are all applicable to the present embodiment, which will not be listed herein.

During the determination of the specified objects, the connection line with the maximum correlation value calculated may be a false detection object. In order to further improve the accuracy of object detection, a preset correlation threshold may be set to determine whether the maximum correlation value of the connection line is greater than the preset correlation threshold. If so, it indicates that the connection line is an accurate specified object; otherwise, it indicates that the connection line is a false detection object, and the detection result is discarded. After a specified object is determined, it may determine whether the specified object exists in the image to be detected, and determine the accurate position information of the specified object.

In the present embodiment, the object upper-vertex confidence distribution diagram, the object lower-vertex confidence distribution diagram, and the object upper-and-lower-vertex correlation diagram of the image to be detected are generated by inputting the obtained image to be detected into the fully convolutional neural network obtained by training. The upper-vertex objects and the lower-vertex objects in the image to be detected are determined respectively according to the object upper-vertex confidence distribution diagram and the object lower-vertex confidence distribution diagram. The correlation value of the connection line connecting the first vertex object and each second vertex object is calculated by mapping the upper-vertex objects and the lower-vertex objects into the object upper-and-lower-vertex correlation diagram. Finally, the connection line having the maximum correlation value is determined as the specified object by matching the upper-vertex objects and lower-vertex objects. By using the fully convolutional neural network obtained by training, the upper-vertex objects and lower-vertex objects of the specified objects can be extracted. The connections between the upper-vertex objects and lower-vertex objects are established by mapping, and then the connection lines connecting upper-vertex objects and lower-vertex objects that are matched successfully are used as the specified objects. The specified objects are represented by the connection lines, which avoid the case where candidate boxes are overlapped, even if the specified objects are distributed densely. Since the upper-vertex objects and lower-vertex objects of the specified objects can be accurately identified by the fully convolutional neural network, the specified objects can be clearly distinguished through the connection lines between the upper-vertex objects and lower-vertex objects, which improves the accuracy of object detection. In addition, since the detected specified objects are represented by the connection lines connecting the upper-vertex objects and lower-vertex objects, the gesture of the specified objects (such as, lean forward, lean backward, bent, etc.) can be accurately and clearly reflected by the connection lines, which can facilitate subsequent applications of object behavior analysis and the like. With the present embodiment, features with high distinction are extracted through convolution and mapping layer by layer, and then the upper-vertex objects and lower-vertex objects are accurately located and matched. The upper-vertex objects and lower-vertex objects successfully matched are used as the detection result for the specified objects. This has the advantages of great robustness and high accuracy of object detection. This also has the advantage that there is no need to set an anchor frame of certain scale and aspect ratio in advance as a reference frame during the detection, and thus the performance of the object detection does not depend on the selection of the anchor frame, which naturally solves the problem that object detection is influenced by the scale and aspect ratio.

Figure 3:
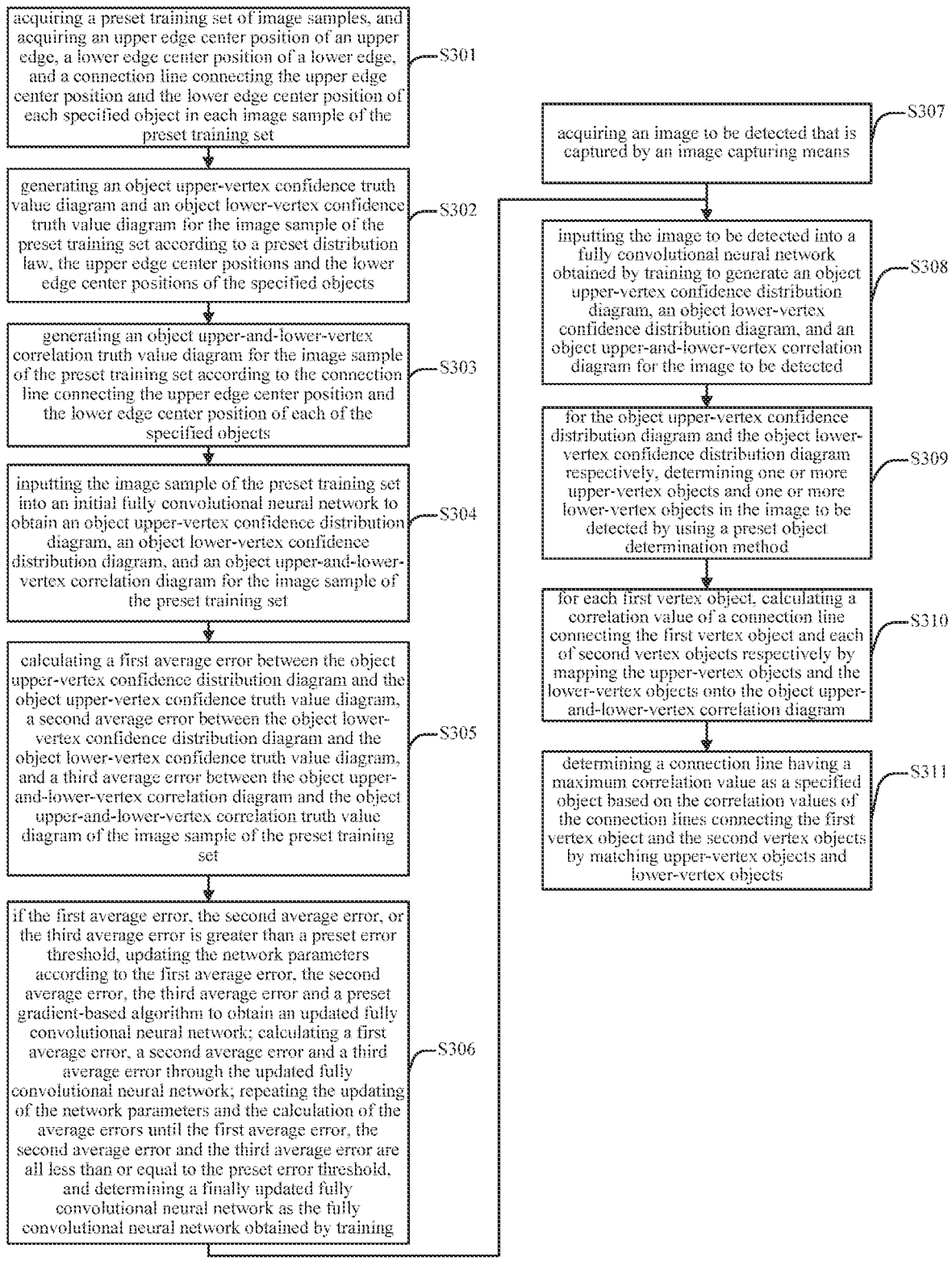
FIG. 3 is a schematic flowchart of another method for object detection according to an embodiment of the present application.

Based on the embodiment shown in FIG. 1, as shown in FIG. 3, an embodiment of the present application further provides a method for object detection, and the method may include following steps.

At step S301, a preset training set of image samples is acquired, and an upper edge center position of an upper edge, a lower edge center position of a lower edge, and a connection line connecting the upper edge center position and the lower edge center position of each specified object in the each image sample of the preset training set are acquired.

In the present embodiment, before the operations of the fully convolutional neural network, it needs to first construct the fully convolutional neural network. Since the network parameters of the fully convolutional neural network are obtained by training, the training process may be understood as a process learning the upper-vertex objects and the lower-vertex objects of the specified objects. The training set of image samples need to be constructed based on features of different specified objects. Different images correspond to the features of the upper-vertex objects and lower-vertex objects of different specified objects, and it may preset that the confidences of the upper-vertex objects and lower-vertex objects follow a circular Gaussian distribution. Therefore, it needs to obtain an upper edge center position (such as, the position of the top point of the head of people) and a lower edge center position (such as, the center between the feet of people), and a connection line connecting the upper edge center position and the lower edge center position of each specified object, wherein the upper edge center positions and the lower edge center positions may be calibrated.

At step S302, an object upper-vertex confidence truth value diagram and an object lower-vertex confidence truth value diagram for the image sample of the preset training set are generated according to a preset distribution law, the upper edge center positions and the lower edge center positions of the specified objects.

The preset distribution law is a probability distribution that the confidences of the upper-vertex objects and lower-vertex objects of the specified objects obey. In general, the confidences of the upper-vertex objects and lower-vertex objects follow the circular Gaussian distribution, the present embodiment is of course not limited thereto. For example, the upper edge center position of each specified object in the image is $P_{up}$, and the lower edge center position of each specified object is $P_{down}$, and the confidences of the upper-vertex objects and the lower-vertex objects follow the circular Gaussian distribution N. The object upper-vertex confidence truth value diagram and the object lower-vertex confidence truth value diagram of the image sample of the preset training set are obtained according to formulas (1) and (2).

$$\begin{cases} D_{up}(p) = \max_{n_{ped}} N(p; P_{up}, \sigma_{up}) \\ D_{down}(p) = \max_{n_{ped}} N(p; P_{down}, \sigma_{down}) \end{cases} \quad (1)$$

$$\begin{cases} N(p; P_{up}, \sigma_{up}) = \exp\left(-\frac{\|p - P_{up}\|_2^2}{\sigma_{up}}\right) \\ N(p; P_{up}, \sigma_{up}) = \exp\left(-\frac{\|p - P_{up}\|_2^2}{\sigma_{up}}\right) \end{cases} \quad (2)$$

where, p represents the coordinates of position of a pixel on the confidence truth value diagrams; up represents the upper-vertex object of a specified object; $D_{up}(p)$ represents the confidence of the upper-vertex object at the coordinates p on the object upper-vertex confidence truth value diagram; $n_{ped}$ represents the total number of specified objects in an image sample of the training set; $P_{up}$ represents the coordinates of the position of the calibrated upper-vertex object of a specified object in the image sample of the training set; $\sigma_{up}$ represents the variance of the circular Gaussian distribution N that the upper-vertex objects follow; down represents the lower-vertex object of a specified object; $D_{down}(p)$ represents the confidence of the calibrated lower-vertex at the coordinates p on the object lower-vertex confidence truth value diagram; $P_{down}$ represents the coordinates of the position of the calibrated lower-vertex object of a specified object in the image sample of the training set; and $\sigma_{down}$ represents the variance of the circular Gaussian distribution N that the lower-vertex objects follow. The formula (2) is a standard Gaussian distribution, ensuring that there is the highest confidence of 1.0 among the calibrated upper-vertex objects and lower-vertex objects of the specified objects, and the confidences gradually decrease to 0 at the ends in Gaussian distribution.

At step S303, an object upper-and-lower-vertex correlation truth value diagram for the image sample of the preset training set is generated according to the connection line connecting the upper edge center position and the lower edge center position of each of the specified objects.

In general, for a specified object, the correlation value of the connection line connecting the upper-vertex object and the lower-vertex object is subject to a unit vector $\vec{v}$. The amplitude of the unit vector is equal to 1, and its direction is along the connection line, the present embodiment is of course not limited thereto. The object upper-and-lower-vertex correlation truth value diagram for the image sample of the preset training set may be generated according to the connection lines connecting the upper edge center positions and the lower edge center positions of the specified objects and according to formulas (3) and (4).

$$A(p) = \frac{1}{n_{ped}} \sum_{n_{ped}} E_{ped}(p) \quad (3)$$

$$E_{ped}(p) = \begin{cases} \vec{v} & p \text{ is on the connection line} \\ 0 & \text{others} \end{cases} \quad (4)$$

where, p represents the coordinates of the position of a pixel on the object upper-and-lower-vertex correlation truth value diagram; A(p) represents the correlation value at the coordinates p on the object upper-and-lower-vertex correlation truth value diagram; and $n_{ped}$ represents the total number of the specified objects in the image sample of the training set. The formula (4) indicates that the correlation value of the connection line connecting the upper-vertex object and the lower-vertex object of a specified object is represented by a unit vector $\vec{v}$ with amplitude equal to 1 and along the direction of the connection line.

Figure 4:
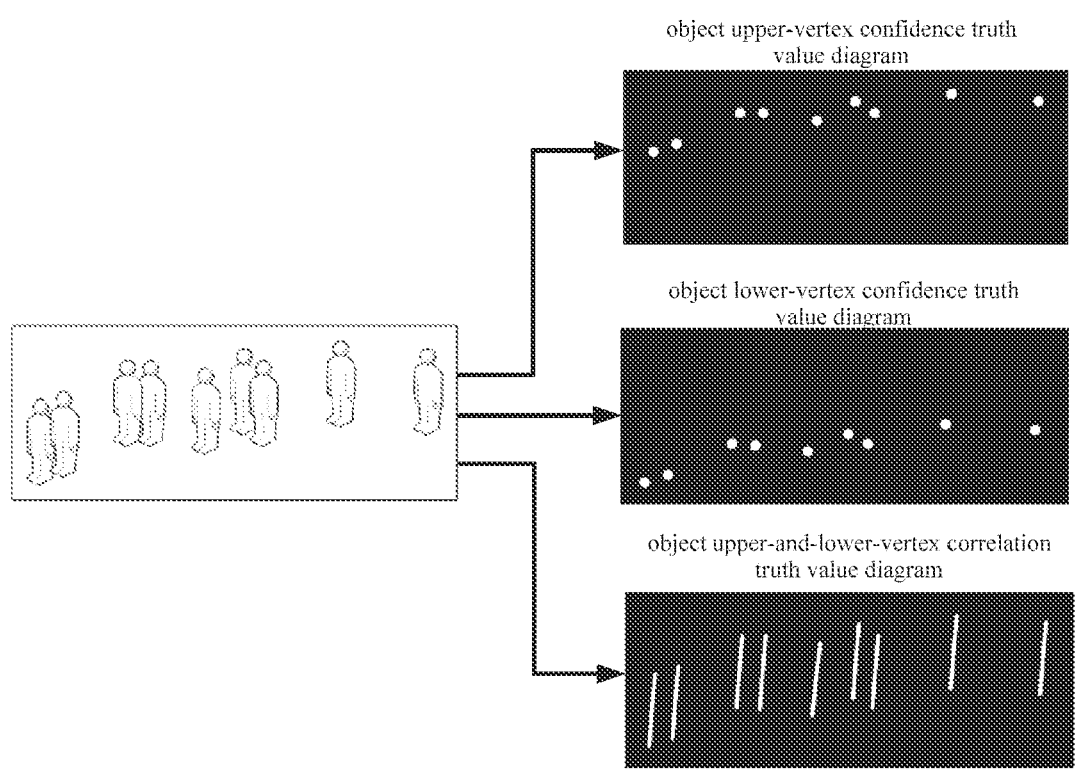
FIG. 4 is a diagram illustrating an object upper-vertex confidence truth value diagram, an object lower-vertex confidence truth value diagram, and an upper-and-lower-vertex correlation truth value diagram obtained by performing extraction on the image to be detected according to an embodiment of the present application.

The generation of the object upper-vertex confidence truth value diagram, the object lower-vertex confidence truth value diagram and the object upper-and-lower-vertex correlation truth value diagram of the preset training set of image samples is shown in FIG. 4. Taking people as an specified object, as seen from the object upper-vertex confidence truth value diagram in the figure, each bright point corresponds to an upper-vertex object of a specified object in the image sample of the preset training set. As seen from the object lower-vertex confidence truth value diagram in the figure, each bright point corresponds to a lower-vertex object of a specified object in the image sample of the preset training set. As seen from the object upper-and-lower-vertex correlation truth value diagram in the feature, each connection line is a connection line connecting the upper-vertex object and the lower-vertex object of a specified object.

At step S304, the image sample of the preset training set is into an initial fully convolutional neural network to obtain an object upper-vertex confidence distribution diagram, an object lower-vertex confidence distribution diagram, and an object upper-and-lower-vertex correlation diagram for the image sample of the preset training set.

Network parameters of the initial fully convolutional neural network are preset values. The object upper-vertex confidence distribution diagram, the object lower-vertex confidence distribution diagram, and the object upper-and-lower-vertex correlation diagram for the image sample of the preset training set are obtained through the initial fully convolutional neural network. The object upper-vertex confidence distribution diagram will be used to compare with the above object upper-vertex confidence truth value diagram; the object lower-vertex confidence distribution diagram will used to compare with the above object lower-vertex confidence truth value diagram; and the object upper-and-lower-vertex correlation diagram will be used to compare with the above object upper-and-lower-vertex correlation truth value diagram. With repeatedly training and learning and updating of the network parameters, the object upper-vertex confidence distribution diagram output from the fully convolutional neural network is closer to the object upper-vertex confidence truth value diagram, the object lower-vertex confidence distribution diagram is closer to the object lower-vertex confidence truth value diagram, and the object upper-and-lower-vertex correlation diagram is closer to the object upper-and-lower-vertex correlation truth value diagram. When they are close enough, the fully convolutional neural network is determined as a trained fully convolutional neural network that can perform object detection.

Optionally, the fully convolutional neural network may include a convolutional layer, a downsampling layer, and a deconvolutional layer.

The fully convolutional neural network usually includes at least one convolutional layer and at least one downsampling layer, and the deconvolutional layer is optional. A deconvolutional layer may be provided after the last convolutional layer, such that the resulting feature map has a same resolution as the image sample of the preset training set, so as to reduce the conversion operation for calculating the image compression ratio to facilitate confidence calculation.

Optionally, the object upper-vertex confidence distribution diagram, the object lower-vertex confidence distribution diagram, and the object upper-and-lower-vertex correlation diagram for the image sample of the preset training set may be obtained through the following steps.

Step 1, inputting the image sample of the preset training set into the initial fully convolutional neural network, and extracting features of the image sample of the preset training set through a network structure including the convolutional layers and the downsampling layers alternately arranged.

Step 2, upsampling the features such that the features have a same resolution as the image sample of the preset training set through the deconvolutional layer, to obtain an upsampled features.

Figure 5:
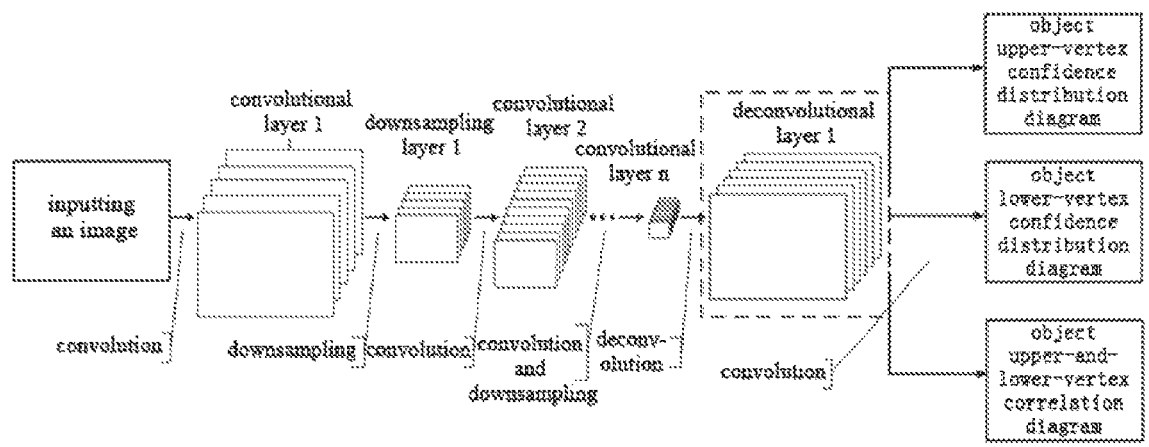
FIG. 5 is a schematic structural diagram of another fully convolutional neural network according to an embodiment of the present application.

The image samples of the preset training set are input into the initial fully convolutional neural network. As shown in FIG. 5, features sequentially extracted from a low layer to a high layer are using a series of convolutional layers and downsampling layers. The series of the convolutional layers and the downsampling layers are arranged alternately. The features are then upsampled to have a size same as the size of the input image samples of the preset training set through the deconvolutional layer.

Step 3, applying a convolutional layer of 1×1 on the upsampled features obtained in Step 2 to calculate the object upper-vertex confidence distribution diagram, the object lower-vertex confidence distribution diagram, and the object upper-and-lower-vertex correlation diagram that have the same resolution as the image sample of the preset training set.

In order to ensure that the object upper-vertex confidence distribution diagram, the object lower-vertex confidence distribution diagram, and the object upper-and-lower-vertex correlation diagram have the same resolution as the image sample of the preset training set, the output from the upsampling may be processed through a convolutional layer. The size of the convolution kernel of the convolutional layer may be selected as 1×1, 3×3, or 5×5. However, in order to accurately extract a feature of one pixel, the size of the convolution kernel of the convolutional layer may be selected as 1×1. Through the calculation of this convolutional layer, the object upper-vertex confidence distribution diagram, the object lower-vertex confidence distribution diagram, and the object upper-and-lower-vertex correlation diagram can be obtained.

At step S305, a first average error between the object upper-vertex confidence distribution diagram and the object upper-vertex confidence truth value diagram of the image sample of the present training set, a second average error between the object lower-vertex confidence distribution diagram and the object lower-vertex confidence truth value diagram of the image sample of the preset training set, and a third average error between the object upper-and-lower-vertex correlation diagram and the object upper-and-lower-vertex correlation truth value diagram of the image sample of the preset training set.

At step S306, if the first average error, the second average error, or the third average error is greater than a preset error threshold, updating network parameters according to the first average error, the second average error, the third average error and a preset gradient-based algorithm to obtain an updated fully convolutional neural network; calculating a first average error, a second average error and a third average error through the updated fully convolutional neural network; repeating the updating of the network parameters and the calculation of the average errors until the first average error, the second average error and the third average error are all less than or equal to the preset error threshold, and determining a finally updated fully convolutional neural network as the fully convolutional neural network obtained by training.

The fully convolutional neural network may be trained using a classic back propagation algorithm. The preset gradient calculation strategy may be an ordinary gradient descent method or a random gradient descent method. The gradient descent method uses the negative gradient direction as the search direction. The closer to the target value, the smaller the step size, and the slower the progress. Since the random gradient descent method uses only one sample at a time, the speed of one iteration is much higher than that of the ordinary gradient descent method. Therefore, in order to improve the operation efficiency, the present embodiment may use the random gradient descent method to update the network parameters. During the training, the first average error between the object upper-vertex confidence distribution diagram and the object upper-vertex confidence truth value diagram, the second average error between the object lower-vertex confidence distribution diagram and the object lower-vertex confidence truth value diagram, and the third average error between the object upper-and-lower-vertex correlation diagram and the object upper-and-lower-vertex correlation truth value diagram of the image sample of the preset training set are calculated through the fully convolutional neural network. As shown in formulas (5) and (6), the network parameters of the fully convolutional neural network are updated by using the average errors, and the above process is iteratively performed until the average errors are no longer decreased. The network parameters of the fully convolutional neural network include a convolution kernel parameter and an offset parameter of a convolutional layer.

$$\begin{cases} L_D(\theta) = \frac{1}{N} \sum_i^N \|F_D(X_i; \theta) - D_i\|^2 \\ L_A(\theta) = \frac{1}{N} \sum_i^N \|F_A(X_i; \theta) - A_i\|^2 \end{cases} \quad (5)$$

$$L(\theta) = L_D(\theta) + \lambda L_A(\theta) \quad (6)$$

where, $L_D(\theta)$: represents the first average error or the second average error; $\theta$ represents the network parameters of the fully convolutional neural network; N represents the number of image samples of the preset training set; $F_D(X_i;\theta)$ represents the object upper-vertex confidence distribution diagram or the object lower-vertex confidence distribution diagram output from the fully convolutional neural network; $X_i$ represents an input image that is input to the network and has a serial number of i; i represents the serial number of an image; $D_i$ represents the object upper-vertex confidence truth value diagram or the object lower-vertex confidence truth value diagram obtained through the formulas (1) and (2); $L_A(\theta)$ represents the third average error; $F_A(X_i;\theta)$ represents the object upper-and-lower-vertex correlation diagram output from the fully convolutional neural network; Ai represents the object upper-and-lower-vertex correlation truth value diagram obtained through the formulas (3) and (4); and $\lambda$ represents a balance parameter between two errors, which is usually 1.0.

At step S307, an image to be detected that is captured by an image capturing means is acquired.

At step S308, the image to be detected is input into a fully convolutional neural network obtained by training to generate an object upper-vertex confidence distribution diagram, an object lower-vertex confidence distribution diagram, and an object upper-and-lower-vertex correlation diagram for the image to be detected.

At step S309, for the object upper-vertex confidence distribution diagram and the object lower-vertex confidence distribution diagram respectively, one or more upper-vertex objects and one or more lower-vertex object in the image to be detected are determined by using a preset object determination method.

At step S310, for each first vertex, a correlation value of a connection line connecting the first vertex object and each of second vertex objects are calculated respectively by mapping the upper-vertex objects and the lower-vertex objects onto the object upper-and-lower-vertex correlation diagram.

At step S311, a connection line having a maximum correlation value is determined as a specified object based on the correlation values of the connection lines connecting the first vertex object and the second vertex objects by matching upper-vertex objects and lower-vertex objects.

Steps S307 to S311 are the same as the steps in the embodiment shown in FIG. 1, and have the same or similar advantages, which will not be repeated herein.

In the present embodiment, the object upper-vertex confidence distribution diagram, the object lower-vertex confidence distribution diagram, and the object upper-and-lower-vertex correlation diagram of the image to be detected are generated by inputting the obtained image to be detected into the fully convolutional neural network obtained by training. The upper-vertex objects and the lower-vertex objects in the image to be detected are determined respectively according to the object upper-vertex confidence distribution diagram and the object lower-vertex confidence distribution diagram. The correlation value of the connection line connecting the first vertex object and each second vertex object is calculated by mapping the upper-vertex objects and the lower-vertex objects into the object upper-and-lower-vertex correlation diagram. Finally, the connection line having the maximum correlation value is determined as the specified object by matching the upper-vertex objects and lower-vertex objects. By using the fully convolutional neural network obtained by training, the upper-vertex objects and lower-vertex objects of the specified objects can be extracted. The connections between the upper-vertex objects and lower-vertex objects are established by mapping, and then the connection lines connecting upper-vertex objects and lower-vertex objects that are matched successfully are used as the specified objects. The specified objects are represented by the connection lines, which avoid the case where candidate boxes are overlapped, even if the specified objects are distributed densely. Since the upper-vertex objects and lower-vertex objects of the specified objects can be accurately identified by the fully convolutional neural network, the specified objects can be clearly distinguished through the connection lines between the upper-vertex objects and lower-vertex objects, which improves the accuracy of object detection. In addition, since the detected specified objects are represented by the connection lines connecting the upper-vertex objects and lower-vertex objects, the gesture of the specified objects (such as, lean forward, lean backward, bent, etc.) can be accurately and clearly reflected by the connection lines, which can facilitate subsequent applications of object behavior analysis and the like. With the present embodiment, features with high distinction are extracted through convolution and mapping layer by layer, and then the upper-vertex objects and lower-vertex objects are accurately located and matched. The upper-vertex objects and lower-vertex objects successfully matched are used as the detection result for the specified objects. This has the advantages of great robustness and high accuracy of object detection. This also has the advantage that there is no need to set an anchor frame of certain scale and aspect ratio in advance as a reference frame during the detection, and thus the performance of the object detection does not depend on the selection of the anchor frame, which naturally solves the problem that object detection is influenced by the scale and aspect ratio. During the training of the fully convolutional neural network, for the upper-vertex objects and lower-vertex objects of the specified objects with different features, a preset training set of image samples are provided. Through the training and iteration on the image samples of the preset training set, a fully convolutional neural network with strong generalization ability is obtained, which is free of complicated cascaded classifiers and has a simpler structure.

The method for object detection according to the embodiment of the present application will be illustrated below in conjunction with a specific example of detecting people as the objects.

For a scene on a street, an image to be detected is captured by a surveillance means, and the image to be detected is input into a fully convolutional neural network obtained by training to obtain an object upper-vertex confidence distribution diagram, an object lower-vertex confidence distribution diagram, and an object upper-and-lower-vertex correlation diagram of the image to be detected. For the object upper-vertex confidence distribution diagram and the object lower-vertex confidence distribution diagram of the image to be detected respectively, the position of the center point of each detection object is determined by using a non-maximum suppression method. When the confidences of pixels in the neighborhood of the center points of the detection objects are greater than a preset confidence threshold, the vertexes of the heads of people and the center positions between the feet of the people are determined.

Figure 6:
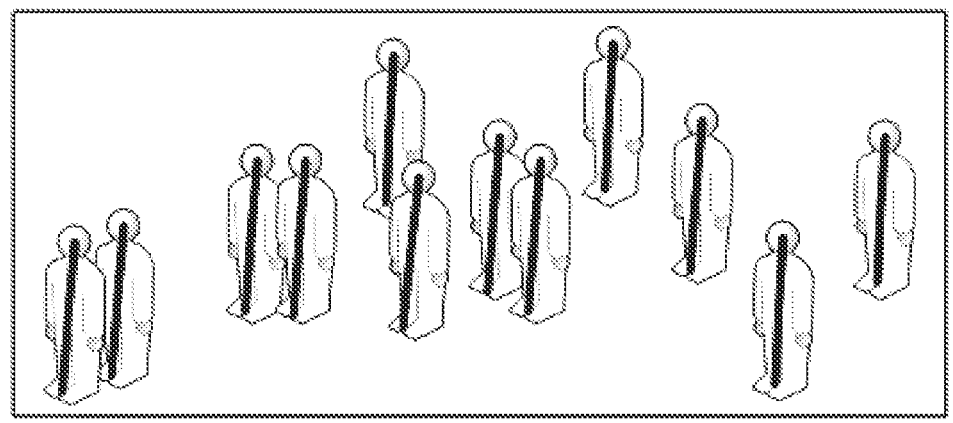
FIG. 6 is a schematic diagram of a detection result for people according to an embodiment of the present application.

The vertexes of the heads of the people and the center positions between the feet of the people are mapped onto the object upper-and-lower-vertex correlation diagram obtained above, to obtain a correlation degree value of the vertex of the head of each people and a correlation degree value of the center position between the feet of each people. The average value of the correlation degree value of the vertex of the head of each people and the correlation degree value of the central position between the feet of each people may be calculated. Through the determination and matching of the average values, a detection result is determined as shown in FIG. 6, and each connection line represents one people.

In comparison with the related art, in the present solution, the object upper-vertex confidence distribution diagram, the object lower-vertex confidence distribution diagram, and the object upper-and-lower-vertex correlation diagram of the image to be detected are generated by inputting the obtained image to be detected into the fully convolutional neural network obtained by training. The upper-vertex objects and the lower-vertex objects in the image to be detected are determined respectively according to the object upper-vertex confidence distribution diagram and the object lower-vertex confidence distribution diagram. The correlation value of the connection line connecting the first vertex object and each second vertex object is calculated by mapping the upper-vertex objects and the lower-vertex objects into the object upper-and-lower-vertex correlation diagram. Finally, the connection line having the maximum correlation value is determined as the specified object by matching the upper-vertex objects and lower-vertex objects. By using the fully convolutional neural network obtained by training, the upper-vertex objects and lower-vertex objects of the specified objects can be extracted. The connections between the upper-vertex objects and lower-vertex objects are established by mapping, and then the connection lines connecting upper-vertex objects and lower-vertex objects that are matched successfully are used as the specified objects. The specified objects are represented by the connection lines, which avoid the case where candidate boxes are overlapped, even if the specified objects are distributed densely. Since the upper-vertex objects and lower-vertex objects of the specified objects can be accurately identified by the fully convolutional neural network, the specified objects can be clearly distinguished through the connection lines between the upper-vertex objects and lower-vertex objects, which improves the accuracy of object detection. In addition, since the detected specified objects are represented by the connection lines connecting the upper-vertex objects and lower-vertex objects, the gesture of the specified objects (such as, lean forward, lean backward, bent, etc.) can be accurately and clearly reflected by the connection lines, which can facilitate subsequent applications of object behavior analysis and the like.

Figure 7:
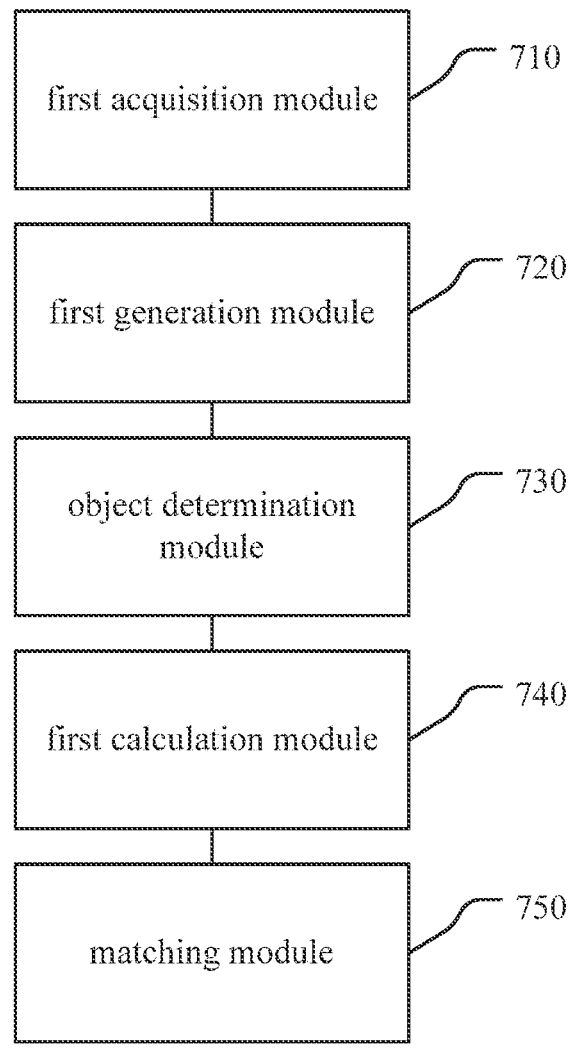
FIG. 7 is a schematic structural diagram of an apparatus for object detection according to an embodiment of the present application.

Corresponding to the above method embodiment, an embodiment of the present application provides an apparatus for object detection, as shown in FIG. 7, the apparatus includes: a first acquisition module 710, a first generation module 720, an object determination module 730, a first calculation module 740, and a matching module 750.

The first acquisition module 710 is configured for acquiring an image to be detected that is captured by an image capturing means.

The first generation module 720 is configured for inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected.

The object determination module 730 is configured for, for the object upper-vertex confidence distribution diagram and the object lower-vertex confidence distribution diagram respectively, determining one or more upper-vertex objects and one or more lower-vertex objects in the image to be detected by using a preset object determination method.

The first calculation module 740 is configured for, for each first vertex object, calculating a correlation value of a connection line connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object.

The matching module 750 is configured for determining a connection line having a maximum correlation value as a specified object based on the correlation values of the connection lines connecting the first vertex object and the second vertex objects by matching upper-vertex objects and lower-vertex objects.

In the present embodiment, the object upper-vertex confidence distribution diagram, the object lower-vertex confidence distribution diagram, and the object upper-and-lower-vertex correlation diagram of the image to be detected are generated by inputting the obtained image to be detected into the fully convolutional neural network obtained by training. The upper-vertex objects and the lower-vertex objects in the image to be detected are determined respectively according to the object upper-vertex confidence distribution diagram and the object lower-vertex confidence distribution diagram. The correlation value of the connection line connecting the first vertex object and each second vertex object is calculated by mapping the upper-vertex objects and the lower-vertex objects into the object upperand-lower-vertex correlation diagram. Finally, the connection line having the maximum correlation value is determined as the specified object by matching the upper-vertex objects and lower-vertex objects. By using the fully convolutional neural network obtained by training, the upper-vertex objects and lower-vertex objects of the specified objects can be extracted. The connections between the upper-vertex objects and lower-vertex objects are established by mapping, and then the connection lines connecting upper-vertex objects and lower-vertex objects that are matched successfully are used as the specified objects. The specified objects are represented by the connection lines, which avoid the case where candidate boxes are overlapped, even if the specified objects are distributed densely. Since the upper-vertex objects and lower-vertex objects of the specified objects can be accurately identified by the fully convolutional neural network, the specified objects can be clearly distinguished through the connection lines between the upper-vertex objects and lower-vertex objects, which improves the accuracy of object detection. In addition, since the detected specified objects are represented by the connection lines connecting the upper-vertex objects and lower-vertex objects, the gesture of the specified objects (such as, lean forward, lean backward, bent, etc.) can be accurately and clearly reflected by the connection lines, which can facilitate subsequent applications of object behavior analysis and the like. With the present embodiment, features with high distinction are extracted through convolution and mapping layer by layer, and then the upper-vertex objects and lower-vertex objects are accurately located and matched. The upper-vertex objects and lower-vertex objects successfully matched are used as the detection result for the specified objects. This has the advantages of great robustness and high accuracy of object detection. This also has the advantage that there is no need to set an anchor frame of certain scale and aspect ratio in advance as a reference frame during the detection, and thus the performance of the object detection does not depend on the selection of the anchor frame, which naturally solves the problem that object detection is influenced by the scale and aspect ratio.

Optionally, the object determination module 730 is specifically configured for:

determining a position of a center point of at least one detected object by using a non-maximum suppression method based on the object upper-vertex confidence distribution diagram and the object lower-vertex confidence distribution diagram respectively;

acquiring confidences of all pixels in a neighborhood of the center point of each detected object; and in the object upper-vertex confidence distribution diagram, determining a detection object in which the confidence of each pixel is greater than a preset confidence threshold as an upper-vertex object; in the object lower-vertex confidence distribution diagram, determining a detection object in which the confidence of each pixel is greater than the preset confidence threshold as a lower-vertex object.

Optionally, the first calculation module 740 is specifically configured for:

mapping the upper-vertex objects and the lower-vertex objects onto the object upper-and-lower-vertex correlation diagram to obtain a correlation degree value of each upper-vertex object and a correlation degree value of each lower-vertex object;

for the first vertex object, connecting the first vertex object to each of the second vertex objects; and calculating an average value of the correlation degree value of the first vertex object and the correlation degree value of each of the second vertex objects as the correlation value of the connection line connecting the first vertex object and each of the second vertex objects.

Optionally, the matching module 750 is specifically configured for:

selecting a maximum correlation value from the correlation values of the connection lines connecting the first vertex object and the second vertex objects by using a preset bipartite matching method; and determining a connection line corresponding to the maximum correlation value as the specified object.

Optionally, the matching module 750 is further configured for:

acquiring a preset correlation threshold;

determining whether the maximum correlation value is greater than the preset correlation threshold;

if so, determining the connection line corresponding to the maximum correlation value as the specified object.

It should be noted that the apparatus for object detection according to the embodiment of the present application is an apparatus applying the method for object detection shown in FIG. 1. All the embodiments of the above method for object detection are applicable to the apparatus, and the same or similar advantages can be achieved.

Figure 8:
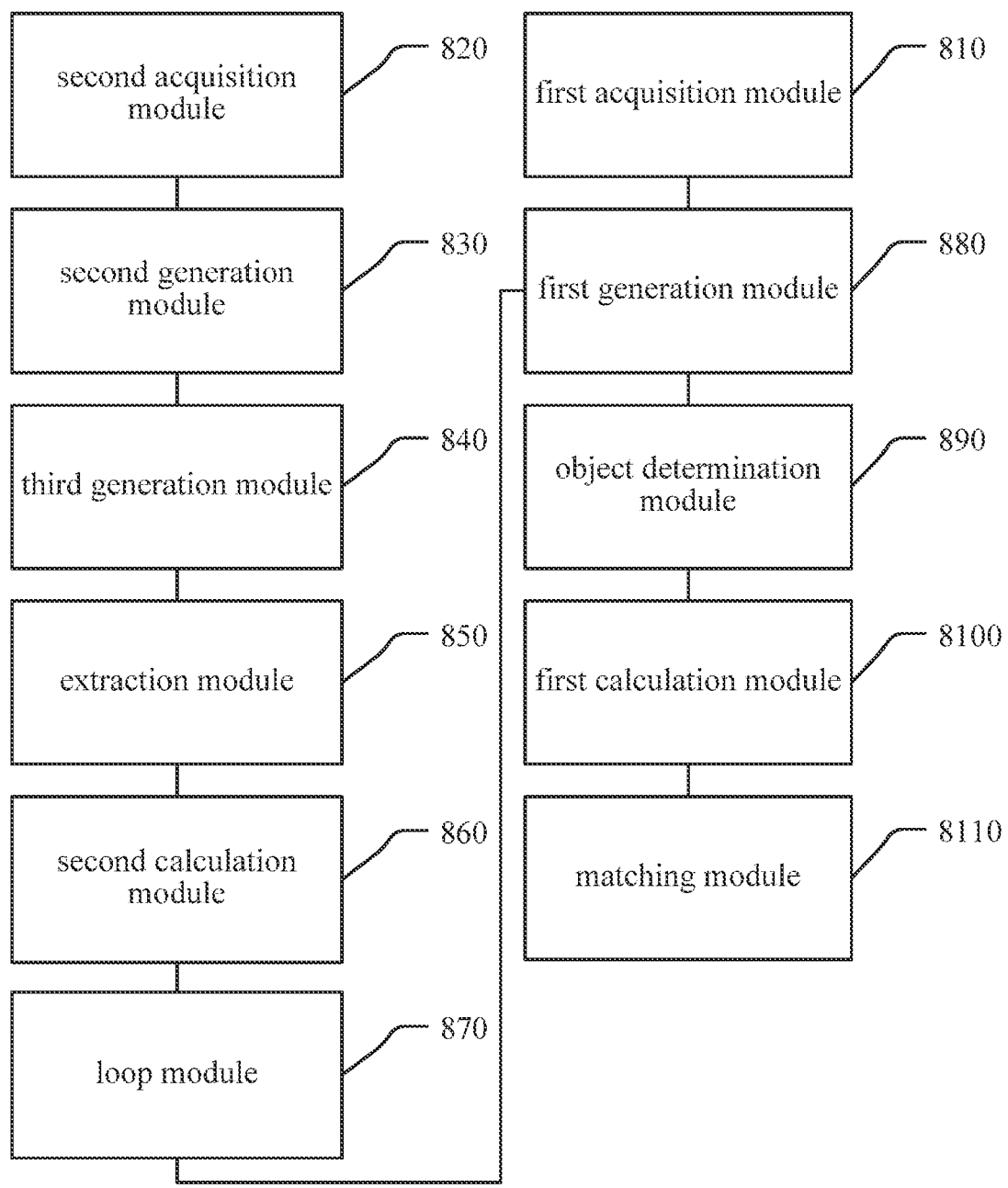
FIG. 8 is a schematic structural diagram of another apparatus for object detection according to an embodiment of the present application.

Based on the embodiment shown in FIG. 7, an embodiment of the present application further provides an apparatus for object detection, as shown in FIG. 8, the apparatus includes: a first acquisition module 810, a second acquisition module 820, a second generation module 830, a third generation module 840, an extraction module 850, a second calculation module 860, a loop module 870, a first generation module 880, an object determination module 890, a first calculation module 8100, and a matching module 8110.

The first acquisition module 810 is configured for acquiring an image to be detected that is captured by an image capturing means.

The second acquisition module 820 is configured for acquiring a preset training set of image samples, and acquiring an upper edge center position of an upper edge, a lower edge center position of a lower edge, and a connection line connecting the upper edge center position and the lower edge center position of each specified object in each image sample of the preset training set.

The second generation module 830 is configured for generating an object upper-vertex confidence truth value diagram and an object lower-vertex confidence truth value diagram for the image sample of the preset training set according to a preset distribution law, the upper edge center positions and the lower edge center positions of the specified objects.

The third generation module 840 is configured for generating an object upper-and-lower-vertex correlation truth value diagram for the image sample of the preset training set according to the connection line connecting the upper edge center position and the lower edge center position of each of the specified objects.

The extraction module 850 is configured for inputting the image sample of the preset training set into an initial fully convolutional neural network to obtain an object upper-vertex confidence distribution diagram, an object lower-vertex confidence distribution diagram, and an object upper-and-lower-vertex correlation diagram for the image sample of the preset training set, wherein network parameters of the initial fully convolutional neural network are preset values.

The second calculation module 860 is configured for calculating a first average error between the object upper-vertex confidence distribution diagram and the object upper-vertex confidence truth value diagram of the image sample of the preset training set, a second average error between the object lower-vertex confidence distribution diagram and the object lower-vertex confidence truth value diagram of the image sample of the preset training set, and a third average error between the object upper-and-lower-vertex correlation diagram and the object upper-and-lower-vertex correlation truth value diagram of the image sample of the preset training set.

The loop module 870 is configured for, if the first average error, the second average error, or the third average error is greater than a preset error threshold, updating the network parameters according to the first average error, the second average error, the third average error and a preset gradient-based algorithm to obtain an updated fully convolutional neural network; calculating a first average error, a second average error and a third average error through the updated fully convolutional neural network; repeating the updating of the network parameters and the calculation of the average errors until the first average error, the second average error and the third average error are all less than or equal to the preset error threshold, and determining a finally updated fully convolutional neural network as the fully convolutional neural network obtained by training.

The first generation module 880 is configured for inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected.

The object determination module 890 is configured for, for the object upper-vertex confidence distribution diagram and the object lower-vertex confidence distribution diagram respectively, determining one or more upper-vertex objects and one or more lower-vertex objects in the image to be detected by using a preset object determination method.

The first calculation module 8100 is configured for, for each first vertex object, calculating a correlation value of a connection line connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object.

The matching module 8110, configured for determining a connection line having a maximum correlation value as a specified object based on the correlation values of the connection lines connecting the first vertex object and the second vertex objects by matching upper-vertex objects and lower-vertex objects.

In the present embodiment, the object upper-vertex confidence distribution diagram, the object lower-vertex confidence distribution diagram, and the object upper-and-lower-vertex correlation diagram of the image to be detected are generated by inputting the obtained image to be detected into the fully convolutional neural network obtained by training. The upper-vertex objects and the lower-vertex objects in the image to be detected are determined respectively according to the object upper-vertex confidence distribution diagram and the object lower-vertex confidence distribution diagram. The correlation value of the connection line connecting the first vertex object and each second vertex object is calculated by mapping the upper-vertex objects and the lower-vertex objects into the object upper-and-lower-vertex correlation diagram. Finally, the connection line having the maximum correlation value is determined as the specified object by matching the upper-vertex objects and lower-vertex objects. By using the fully convolutional neural network obtained by training, the upper-vertex objects and lower-vertex objects of the specified objects can be extracted. The connections between the upper-vertex objects and lower-vertex objects are established by mapping, and then the connection lines connecting upper-vertex objects and lower-vertex objects that are matched successfully are used as the specified objects. The specified objects are represented by the connection lines, which avoid the case where candidate boxes are overlapped, even if the specified objects are distributed densely. Since the upper-vertex objects and lower-vertex objects of the specified objects can be accurately identified by the fully convolutional neural network, the specified objects can be clearly distinguished through the connection lines between the upper-vertex objects and lower-vertex objects, which improves the accuracy of object detection. In addition, since the detected specified objects are represented by the connection lines connecting the upper-vertex objects and lower-vertex objects, the gesture of the specified objects (such as, lean forward, lean backward, bent, etc.) can be accurately and clearly reflected by the connection lines, which can facilitate subsequent applications of object behavior analysis and the like. With the present embodiment, features with high distinction are extracted through convolution and mapping layer by layer, and then the upper-vertex objects and lower-vertex objects are accurately located and matched. The upper-vertex objects and lower-vertex objects successfully matched are used as the detection result for the specified objects. This has the advantages of great robustness and high accuracy of object detection. This also has the advantage that there is no need to set an anchor frame of certain scale and aspect ratio in advance as a reference frame during the detection, and thus the performance of the object detection does not depend on the selection of the anchor frame, which naturally solves the problem that object detection is influenced by the scale and aspect ratio. During the training of the fully convolutional neural network, for the upper-vertex objects and lower-vertex objects of the specified objects with different features, a preset training set of image samples are provided. Through the training and iteration on the image samples of the preset training set, a fully convolutional neural network with strong generalization ability is obtained, which is free of complicated cascaded classifiers and has a simpler structure.

Optionally, the fully convolutional neural network includes convolutional layers, downsampling layers, and a deconvolutional layer.

The extraction module 850 may be specifically configured for:

inputting the image sample of the preset training set into the initial fully convolutional neural network, and extracting features of the image sample of the preset training set through a network structure in which the convolutional layers and the downsampling layers are arranged alternately;

upsampling the features such that the features have a same resolution as the image sample of the preset training set through the deconvolutional layer, to obtain an upsampled features; and applying a convolutional layer of 1×1 on the upsampled features to calculate the object upper-vertex confidence distribution diagram, the object lower-vertex confidence distribution diagram, and the object upper-and-lower-vertex correlation diagram that have a same resolution as the image sample of the preset training set.

It should be noted that the apparatus for object detection according to the embodiment of the present application is an apparatus applying the method for object detection shown in FIG. 3. All the embodiments of the above method for object detection are applicable to the apparatus, and the same or similar advantages can be achieved.

In addition, corresponding to the method for object detection according to the above embodiment, an embodiment of the present application provides a storage medium for storing executable codes that, when executed, carry out all steps of the method for object detection according to the embodiment of the present application.

In the present embodiment, the storage medium has stored thereon the executable codes that, when executed, carry out the method for object detection according to the embodiment of the present application. Upper-vertex objects and lower-vertex objects of the specified objects can be extracted by using the fully convolutional neural network obtained by training. The connections between the upper-vertex objects and lower-vertex objects are established by mapping, and then the connection lines between the upper-vertex objects and lower-vertex objects that are matched successfully are used as the specified objects. The specified objects are represented by connection lines, which avoids a case where candidate boxes are overlapped, even if the specified objects are distributed densely. Since the upper-vertex objects and lower-vertex objects of the specified objects can be accurately located by the fully convolutional neural network, the specified objects can be clearly distinguished through the connection lines connecting the upper-vertex objects and lower-vertex objects, which improves the accuracy of object detection.

In addition, corresponding to the method for object detection according to the above embodiment, an embodiment of the present application provides an application program which, when executed, carries out all steps of the method for object detection according to the embodiment of the present application.

In the present embodiment, the application program carries out the method for object detection according to the embodiment of the present application when executed. Upper-vertex objects and lower-vertex objects of the specified objects can be extracted by using the fully convolutional neural network obtained by training. The connections between the upper-vertex objects and lower-vertex objects are established by mapping, and then the connection lines between the upper-vertex objects and lower-vertex objects that are matched successfully are used as the specified objects. The specified objects are represented by connection lines, which avoids a case where candidate boxes are overlapped, even if the specified objects are distributed densely. Since the upper-vertex objects and lower-vertex objects of the specified objects can be accurately located by the fully convolutional neural network, the specified objects can be clearly distinguished through the connection lines connecting the upper-vertex objects and lower-vertex objects, which improves the accuracy of object detection.

Figure 9:
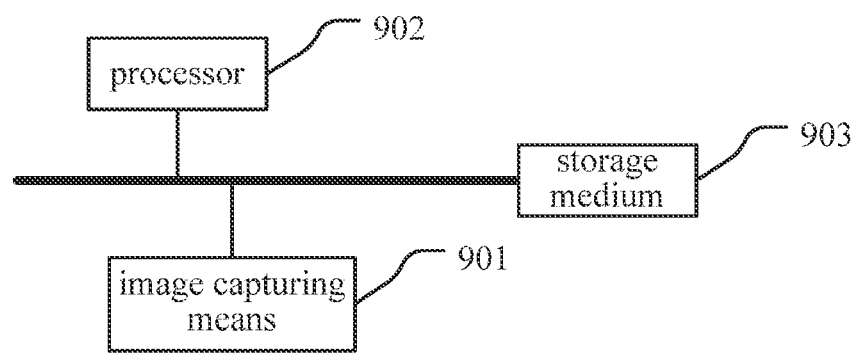
FIG. 9 is a schematic structural diagram of a computer device according to an embodiment of the present application.

In addition, an embodiment of the present application further provides a computer device, as shown in FIG. 9, including an image capturing means 901, a processor 902 and a storage medium 903.

The image capturing means 901 is configured for capturing an image to be detected.

The storage medium 903 is configured for storing executable code.

The processor 902 is configured for implementing all steps of the method for object detection according to the embodiment of the present application when executing the executable code stored in the storage medium 903.

The image capturing means 901, the processor 902 and the storage medium 903 can transmit data through a wired connection or a wireless connection, and the computer device can communicate with other devices through a wired communication interface or a wireless communication interface.

The above storage medium may include an RAM (Random Access Memory), and may also include a NVM (Non-volatile memory), such as at least one disk memory. Optionally, the storage medium may also be at least one storage device located away from the processor.

The above processor may be a general purpose processor, including a CPU (Central Processing Unit), an NP (Network Processor), etc.; it may also be a DSP (Digital Signal Processor), an ASIC (Application Specific Integrated Circuit), an FPGA (Field-Programmable Gate Array) or other programmable logic devices, discrete gates or transistor logic devices, discrete hardware components.

The above image capturing means may be a camera, which is used to photograph the monitoring area, and capture videos or pictures.

In the present embodiment, the processor of the computer device reads and executes the executable codes stored in the storage medium to implement that the following operations. Upper-vertex objects and lower-vertex objects of the specified objects can be extracted by using the fully convolutional neural network obtained by training. The connections between the upper-vertex objects and lower-vertex objects are established by mapping, and then the connection lines between the upper-vertex objects and lower-vertex objects that are matched successfully are used as the specified objects. The specified objects are represented by connection lines, which avoids a case where candidate boxes are overlapped, even if the specified objects are distributed densely. Since the upper-vertex objects and lower-vertex objects of the specified objects can be accurately located by the fully convolutional neural network, the specified objects can be clearly distinguished through the connection lines connecting the upper-vertex objects and lower-vertex objects, which improves the accuracy of object detection.

The embodiments of the storage medium, application program, and computer device are described briefly since they are substantially similar to the above method embodiment, and the related parts can be referred to the corresponding description of the method embodiment.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiments of the apparatus, storage medium, application program and computer device are described briefly since they are substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

The invention claimed is:

1. A method for object detection, comprising:
acquiring an image to be detected that is captured by an image capturing means;
inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected;
for the object upper-vertex confidence distribution diagram and the object lower-vertex confidence distribution diagram respectively, determining one or more upper-vertex objects and one or more lower-vertex objects in the image to be detected by using a preset object determination method;
for each first vertex object, calculating correlation values of connection lines connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object, wherein a connection value of a connection line connecting an upper-vertex object and a lower-vertex object is defined as the sum or the average of he correlation degree values of the upper-vertex object and the lower-vertex object that are connected by this connection line, and wherein each pixel in the object upper-and-lower-vertex correlation diagram represents a correlation degree value indicating the existence of the upper-vertex object or the lower-vertex object of a specified object at the pixel position; and
determining a connection line having a maximum correlation value as a specified object based on the correlation values of the connection lines connecting the first vertex object and the second vertex objects by matching upper-vertex objects and lower-vertex objects,
wherein the fully convolutional neural network is trained by:
acquiring a preset training set of image samples, and acquiring an upper edge center position of an upper edge, a lower edge center position of a lower edge, and a connection line connecting the upper edge center position and the lower edge center position of each specified object in each image sample of the preset training set;
generating an object upper-vertex confidence truth value diagram and an object lower-vertex confidence truth value diagram for the image sample of the preset training set according to a preset distribution law, the upper edge center positions and the lower edge center positions of the specified objects;
generating an object upper-and-lower-vertex correlation truth value diagram for the image sample of the preset training set according to the connection line connecting the upper edge center position and the lower edge center position of each of the specified objects;
inputting the image sample of the preset training set into an initial fully convolutional neural network to obtain an object upper-vertex confidence distribution diagram, an object lower-vertex confidence distribution diagram, and an object upper-and-lower-vertex correlation diagram for the image sample of the preset training set, wherein network parameters of the initial fully convolutional neural network are preset values;
calculating a first average error between the object upper-vertex confidence distribution diagram and the object upper-vertex confidence truth value diagram of the image sample of the preset training set, a second average error between the object lower-vertex confidence distribution diagram and the object lower-vertex confidence truth value diagram of the image sample of the preset training set, and a third average error between the object upper-and-lower-vertex correlation diagram and the object upper-and-lower-vertex correlation truth value diagram of the image sample of the preset training set; and
if the first average error, the second average error, or the third average error is greater than a preset error threshold, updating the network parameters according to the first average error, the second average error, the third average error and a preset gradient-based algorithm to obtain an updated fully convolutional neural network; calculating a first average error, a second average error and a third average error through the updated fully convolutional neural network; repeating the updating of the network parameters and the calculation of the average errors until the first average error, the second average error and the third average error are all less than or equal to the preset error threshold, and determining a finally updated fully convolutional neural network as the fully convolutional neural network obtained by training.

2. The method of claim 1, wherein the fully convolutional neural network comprises convolutional layers, downsampling layers, and a deconvolutional layer;
wherein inputting the image sample of the preset training set into an initial fully convolutional neural network to obtain an object upper-vertex confidence distribution diagram, an object lower-vertex confidence distribution diagram, and an object upper-and-lower-vertex correlation diagram for the image sample of the preset training set comprises:
inputting the image sample of the preset training set into the initial fully convolutional neural network, and extracting features of the image sample of the preset training set through a network structure in which the convolutional layers and the downsampling layers are arranged alternately;
upsampling the features such that the features have a same resolution as the image sample of the preset training set through the deconvolutional layer, to obtain an upsampled features; and
applying a convolutional layer of 1×1 on the upsampled features to calculate the object upper-vertex confidence distribution diagram, the object lower-vertex confidence distribution diagram, and the object upper-and-lower-vertex correlation diagram that have a same resolution as the image sample of the preset training set.

3. The method of claim 1, wherein for the object upper-vertex confidence distribution diagram and the object lower-vertex confidence distribution diagram respectively, determining one or more upper-vertex objects and one or more lower-vertex objects in the image to be detected by using a preset object determination method comprises:
  determining a position of a center point of at least one detected object by using a non-maximum suppression method based on the object upper-vertex confidence distribution diagram and the object lower-vertex confidence distribution diagram respectively;
  acquiring confidences of all pixels in a neighborhood of the center point of each detected object; and
  in the object upper-vertex confidence distribution diagram, determining a detection object in which the confidence of each pixel is greater than a preset confidence threshold as an upper-vertex object; in the object lower-vertex confidence distribution diagram, determining a detection object in which the confidence of each pixel is greater than the preset confidence threshold as a lower-vertex object.

4. The method of claim 1, wherein for each first vertex object, calculating the correlation values of the connection lines connecting the first vertex object and each of second vertex objects respectively by mapping the upper-vertex objects and the lower-vertex objects onto the object upper-and-lower-vertex correlation diagram comprises:
  mapping the upper-vertex objects and the lower-vertex objects onto the object upper-and-lower-vertex correlation diagram to obtain a correlation degree value of each upper-vertex object and a correlation degree value of each lower-vertex object;
  for the first vertex object, connecting the first vertex object to each of the second vertex objects; and
  calculating an average value of the correlation degree value of the first vertex object and the correlation degree value of each of the second vertex objects as the correlation value of the connection line connecting the first vertex object and each of the second vertex objects.

5. The method of claim 1, wherein determining a connection line having a maximum correlation value as a specified object based on the correlation values of the connection lines connecting the first vertex object and the second vertex objects by matching upper-vertex objects and lower-vertex objects comprises:
  selecting a maximum correlation value from the correlation values of the connection lines connecting the first vertex object and the second vertex objects by using a preset bipartite matching method; and
  determining a connection line corresponding to the maximum correlation value as the specified object.

6. The method of claim 5, wherein after selecting a maximum correlation value from the correlation values of the connection lines connecting the first vertex object and the second vertex objects by using a preset bipartite matching method, the method further comprises:
  acquiring a preset correlation threshold;
  determining whether the maximum correlation value is greater than the preset correlation threshold; and
  if so, determining the connection line corresponding to the maximum correlation value as the specified object.

7. A computer device, comprising an image capturing means, a processor and a storage medium, wherein
  the image capturing means is configured for capturing an image to be detected;
  the storage medium is configured for storing executable codes;
  the processor is configured for carrying out the method for object detection of claim 1 when executing the executable codes stored in the storage medium.

8. A non-transitory storage medium having stored thereon executable codes that, when executed, carry out operations comprising:
  acquiring an image to be detected that is captured by an image capturing means;
  inputting the image to be detected into a fully convolutional neural network obtained by training to generate an object upper-vertex confidence distribution diagram, an object lower-vertex confidence distribution diagram, and an object upper-and-lower-vertex correlation diagram for the image to be detected;
  for the object upper-vertex confidence distribution diagram and the object lower-vertex confidence distribution diagram respectively, determining one or more upper-vertex objects and one or more lower-vertex objects in the image to be detected by using a preset object determination method;
  for each first vertex object, calculating correlation values of connection lines connecting the first vertex object and each of second vertex objects respectively by mapping the upper-vertex objects and the lower-vertex objects onto the object upper-and-lower-vertex correlation diagram; wherein if the first vertex object is an upper-vertex object, the second vertex object is a lower-vertex object; and if the first vertex object is a lower-vertex object, the second vertex object is an upper-vertex object, wherein a connection value of a connection line connecting an upper-vertex object and a lower-vertex object is defined as the sum or the average of he correlation degree values of the upper-vertex object and the lower-vertex object that are connected by this connection line, and wherein each pixel in the object upper-and-lower-vertex correlation diagram represents a correlation degree value indicating the existence of the upper-vertex object or the lower-vertex object of a specified object at the pixel position; and
  determining a connection line having a maximum correlation value as a specified object based on the correlation values of the connection lines connecting the first vertex object and the second vertex objects by matching upper-vertex objects and lower-vertex objects,
  wherein the fully convolutional neural network is trained by:
  acquiring a preset training set of image samples, and acquiring an upper edge center position of an upper edge, a lower edge center position of a lower edge, and a connection line connecting the upper edge center position and the lower edge center position of each specified object in each image sample of the preset training set;
  generating an object upper-vertex confidence truth value diagram and an object lower-vertex confidence truth value diagram for the image sample of the preset training set according to a preset distribution law, the upper edge center positions and the lower edge center positions of the specified objects;

generating an object upper-and-lower-vertex correlation truth value diagram for the image sample of the preset training set according to the connection line connecting the upper edge center position and the lower edge center position of each of the specified objects;

inputting the image sample of the preset training set into an initial fully convolutional neural network to obtain an object upper-vertex confidence distribution diagram, an object lower-vertex confidence distribution diagram, and an object upper-and-lower-vertex correlation diagram for the image sample of the preset training set, wherein network parameters of the initial fully convolutional neural network are preset values;

calculating a first average error between the object upper-vertex confidence distribution diagram and the object upper-vertex confidence truth value diagram of the image sample of the preset training set, a second average error between the object lower-vertex confidence distribution diagram and the object lower-vertex confidence truth value diagram of the image sample of the preset training set, and a third average error between the object upper-and-lower-vertex correlation diagram and the object upper-and-lower-vertex correlation truth value diagram of the image sample of the preset training set; and if the first average error, the second average error, or the third average error is greater than a preset error threshold, updating the network parameters according to the first average error, the second average error, the third average error and a preset gradient-based algorithm to obtain an updated fully convolutional neural network; calculating a first average error, a second average error and a third average error through the updated fully convolutional neural network; repeating the updating of the network parameters and the calculation of the average errors until the first average error, the second average error and the third average error are all less than or equal to the preset error threshold, and determining a finally updated fully convolutional neural network as the fully convolutional neural network obtained by training.

9. The storage medium of claim 8, wherein the fully convolutional neural network comprises convolutional layers, downsampling layers, and a deconvolutional layer;

wherein inputting the image sample of the preset training set into an initial fully convolutional neural network to obtain an object upper-vertex confidence distribution diagram, an object lower-vertex confidence distribution diagram, and an object upper-and-lower-vertex correlation diagram for the image sample of the preset training set comprises:

inputting the image sample of the preset training set into the initial fully convolutional neural network, and extracting features of the image sample of the preset training set through a network structure in which the convolutional layers and the downsampling layers are arranged alternately;

upsampling the features such that the features have a same resolution as the image sample of the preset training set through the deconvolutional layer, to obtain an upsampled features; and applying a convolutional layer of 1×1 on the upsampled features to calculate the object upper-vertex confidence distribution diagram, the object lower-vertex confidence distribution diagram, and the object upper-and-lower-vertex correlation diagram that have a same resolution as the image sample of the preset training set.

10. The storage medium of claim 8, wherein for the object upper-vertex confidence distribution diagram and the object lower-vertex confidence distribution diagram respectively, determining one or more upper-vertex objects and one or more lower-vertex objects in the image to be detected by using a preset object determination method comprises:

determining a position of a center point of at least one detected object by using a non-maximum suppression method based on the object upper-vertex confidence distribution diagram and the object lower-vertex confidence distribution diagram respectively;

acquiring confidences of all pixels in a neighborhood of the center point of each detected object; and in the object upper-vertex confidence distribution diagram, determining a detection object in which the confidence of each pixel is greater than a preset confidence threshold as an upper-vertex object; in the object lower-vertex confidence distribution diagram, determining a detection object in which the confidence of each pixel is greater than the preset confidence threshold as a lower-vertex object.

11. The storage medium of claim 8, wherein for each first vertex object, calculating a correlation value of a connection line connecting the first vertex object and each of second vertex objects respectively by mapping the upper-vertex objects and the lower-vertex objects onto the object upper-and-lower-vertex correlation diagram comprises:

mapping the upper-vertex objects and the lower-vertex objects onto the object upper-and-lower-vertex correlation diagram to obtain a correlation degree value of each upper-vertex object and a correlation degree value of each lower-vertex object;

for the first vertex object, connecting the first vertex object to each of the second vertex objects; and calculating an average value of the correlation degree value of the first vertex object and the correlation degree value of each of the second vertex objects as the correlation value of the connection line connecting the first vertex object and each of the second vertex objects.

12. The storage medium of claim 8, wherein determining a connection line having a maximum correlation value as a specified object based on the correlation values of the connection lines connecting the first vertex object and the second vertex objects by matching upper-vertex objects and lower-vertex objects comprises:

selecting a maximum correlation value from the correlation values of the connection lines connecting the first vertex object and the second vertex objects by using a preset bipartite matching method; and determining a connection line corresponding to the maximum correlation value as the specified object.

13. The storage medium of claim 12, wherein after selecting a maximum correlation value from the correlation values of the connection lines connecting the first vertex object and the second vertex objects by using a preset bipartite matching method, the operations further comprise:

acquiring a preset correlation threshold;

determining whether the maximum correlation value is greater than the preset correlation threshold; and if so, determining the connection line corresponding to the maximum correlation value as the specified object.

* * * * *